US012804622B2

(12) United States Patent
Park et al.

(10) Patent No.: US 12,804,622 B2
(45) Date of Patent: Nov. 17, 2026

(54) RECEPTION TIMING DIFFERENCE BETWEEN REFERENCE SIGNALS

(71) Applicant: LG ELECTRONICS INC., Seoul (KR)

(72) Inventors: Haewook Park, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 18/706,323

(22) PCT Filed: Nov. 30, 2022

(86) PCT No.: PCT/KR2022/019199
§ 371 (c)(1),
(2) Date: Apr. 30, 2024

(87) PCT Pub. No.: WO2023/101413
PCT Pub. Date: Jun. 8, 2023

(65) Prior Publication Data
US 2024/0422746 A1 Dec. 19, 2024

(30) Foreign Application Priority Data
Dec. 2, 2021 (KR) ........................ 10-2021-0170557

(51) Int. Cl.
*H04W 72/0446* (2023.01)
*H04B 7/06* (2006.01)
(Continued)

(52) U.S. Cl.
CPC ...... *H04W 72/0446* (2013.01); *H04B 7/0626* (2013.01); *H04L 27/26025* (2021.01); *H04W 72/11* (2023.01)

(58) Field of Classification Search
CPC . H04W 72/0446; H04W 72/11; H04W 72/04; H04L 27/26025; H04L 5/0094;
(Continued)

(56) References Cited

U.S. PATENT DOCUMENTS

2006/0075119 A1* 4/2006 Hussain ................ H04L 69/163 709/227
2008/0165795 A1* 7/2008 Baruch ................... H04L 49/90 370/421
(Continued)

FOREIGN PATENT DOCUMENTS

EP 3536024 B1 * 1/2021 ............ H04W 16/28
WO 2021106092 A1 6/2021
(Continued)

OTHER PUBLICATIONS

ZTE, "Enhancements on beam management for multi-TRP", 3GPP TSG RAN WG1 Meeting #106-e, R1-2106544, Aug. 16-27, 2021.
(Continued)

*Primary Examiner* — Mewale A Ambaye
(74) *Attorney, Agent, or Firm* — BRYAN CAVE LEIGHTON PAISNER LLP

(57) ABSTRACT

Disclosed are a method and an apparatus for transmitting and receiving information about reception timing of radio signals in a wireless communication system. A method for transmitting information about reception timing of reference signals, according to one embodiment of the present disclosure, may comprise the steps of: receiving reference signals belonging to a plurality of reference signal groups from a base station, wherein the reference signals of each of the plurality of reference signal groups are related to different transmission configuration indication (TCI) states or different control resource set (CORESET) pool indices; and
(Continued)

transmitting information about reception timing of the reference signals to the base station.

10 Claims, 9 Drawing Sheets

(51) Int. Cl.
*H04L 27/26* (2006.01)
*H04W 72/11* (2023.01)

(58) Field of Classification Search
CPC ..... H04L 5/0053; H04L 5/0048; H04L 5/005; H04B 7/0626
See application file for complete search history.

(56) References Cited

U.S. PATENT DOCUMENTS

| | | | |
|---|---|---|---|
| 2012/0020250 | A1* | 1/2012 | Sundararaman ...... H04L 49/101 370/256 |
| 2020/0196230 | A1 | 6/2020 | John Wilson et al. |
| 2021/0195609 | A1 | 6/2021 | Taherzadeh Boroujeni et al. |
| 2022/0303968 | A1* | 9/2022 | Sun ........................ H04W 16/28 |
| 2022/0369384 | A1* | 11/2022 | Sakhnini ........... H04L 27/26025 |
| 2023/0007675 | A1* | 1/2023 | Matsumura ....... H04W 72/1273 |
| 2023/0125906 | A1 | 4/2023 | Matsumura et al. |
| 2024/0015796 | A1* | 1/2024 | Fehrenbach ...... H04W 74/0833 |
| 2024/0107396 | A1* | 3/2024 | Ji ......................... H04W 36/362 |

FOREIGN PATENT DOCUMENTS

| | | | |
|---|---|---|---|
| WO | 2021210108 | A1 | 10/2021 |
| WO | 2021229026 | A1 | 11/2021 |

OTHER PUBLICATIONS

ZTE, "Discussion on Multi-TRP inter-cell operation", 3GPP TSG RAN WG1 #106b-e, R1-2108872, Oct. 11-19, 2021.

* cited by examiner

RECEPTION TIMING DIFFERENCE BETWEEN REFERENCE SIGNALS

CROSS-REFERENCE TO RELATED APPLICATIONS

This application is the National Stage filing under 35 U.S.C. 371 of International Application No. PCT/KR2022/019199, filed on Nov. 30, 2022, which claims the benefit of earlier filing date and right of priority to Korean Application No. 10-2021-0170557, filed on Dec. 2, 2021, the contents of which are all incorporated by reference herein in their entireties.

TECHNICAL FIELD

The present disclosure relates to a wireless communication system, and in more detail, relates to a method and an apparatus of transmitting and receiving information on a reception timing of a wireless signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving information on a reception timing of a wireless signal (e.g., physical channel, reference signal, etc.).

In addition, an additional technical object of the present disclosure is to provide a method and an apparatus of transmitting and receiving information on a combination of transmission reception points (TRPs) having similar/same reception timing in a wireless communication system supporting multiple TRPs transmission.

The technical objects to be achieved by the present disclosure are not limited to the above-described technical objects, and other technical objects which are not described herein will be clearly understood by those skilled in the pertinent art from the following description.

A method of transmitting information on a reception timing of a reference signal in a wireless communication system according to an aspect of the present disclosure may include: receiving, from a base station, reference signals belonging to a plurality of reference signal groups, wherein reference signals of each of the plurality of reference signal groups are related to different transmission configuration indication (TCI) states or different control resource set (CORESET) pool indexes; and transmitting, to the base station, information on a reception timing of a reference signal. The information on the reception timing of the reference signal may include information on a reference signal group in which reception timing difference between the reference signals of each of the plurality of reference signal groups is less than a predetermined threshold.

A method of receiving information on a reception timing of a reference signal in a wireless communication system according to an additional aspect of the present disclosure may include: transmitting, to a terminal, reference signals belonging to a plurality of reference signal groups, wherein reference signals of each of the plurality of reference signal groups are related to different transmission configuration indication (TCI) states or different control resource set (CORESET) pool indexes; and receiving, from the terminal, information on a reception timing of a reference signal. The information on the reception timing of the reference signal may include information on a reference signal group in which reception timing difference between the reference signals of each of the plurality of reference signal groups is less than a predetermined threshold.

According to an embodiment of the present disclosure, it is possible to prevent performance degradation that may occur due to differences in reception timing of wireless signals from each TRP in a terminal in a wireless communication system supporting multiple TRP transmission.

In addition, according to an embodiment of the present disclosure, performance for multiple TRP transmission can be improved by performing multiple TRP transmission based on information on a TRP combination reported by a terminal.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
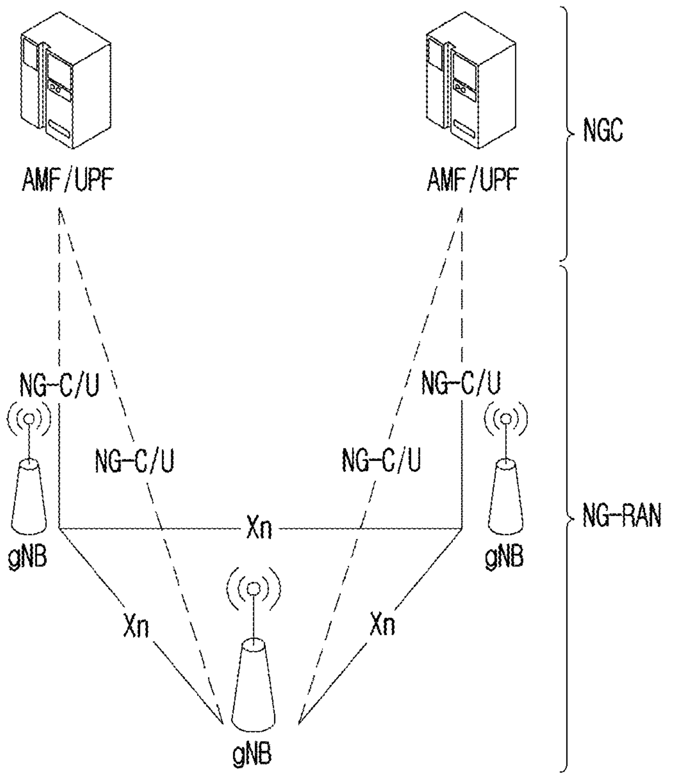
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
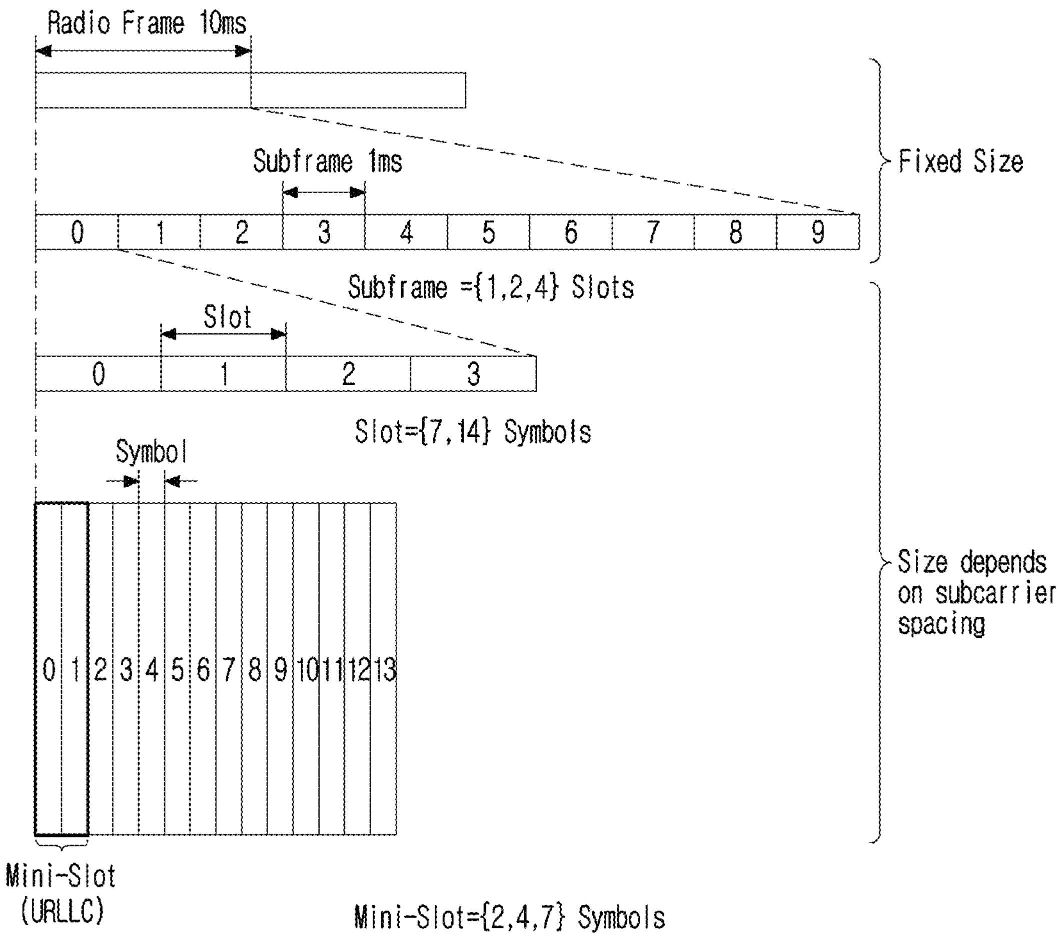
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15,30,60 kHz |
| FR2 | 24250 MHz-52600 MHz | 60,120,240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is 480-103 Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
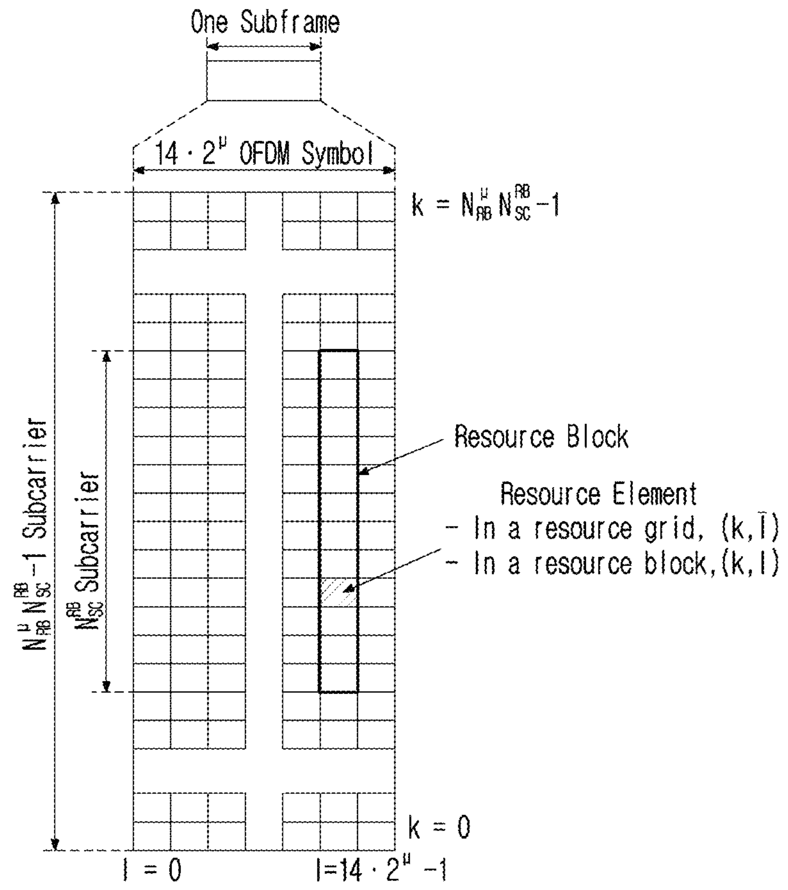
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for p and an antenna port p corresponds to a complex value, $a_{k,l'}^{(p,\mu)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to ‘point A’. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
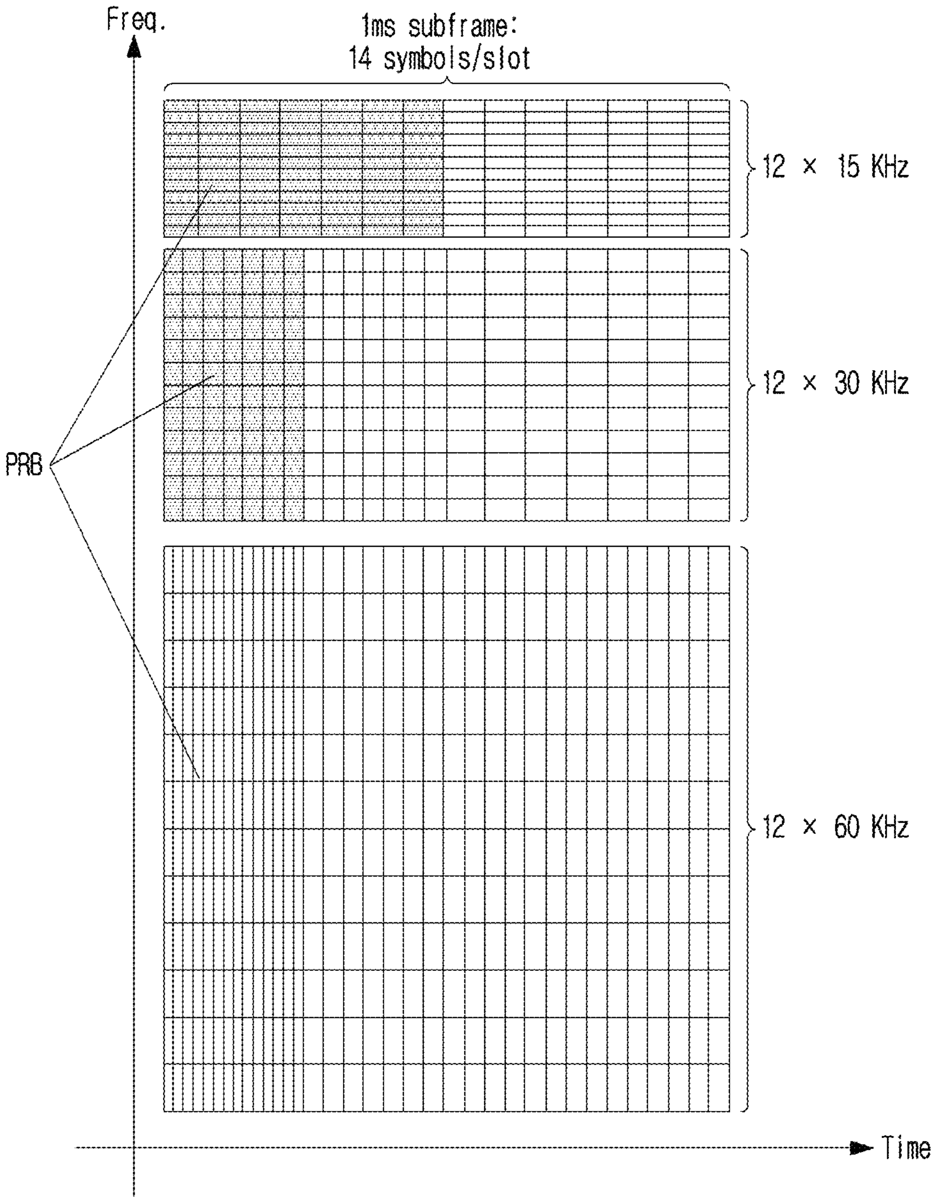
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
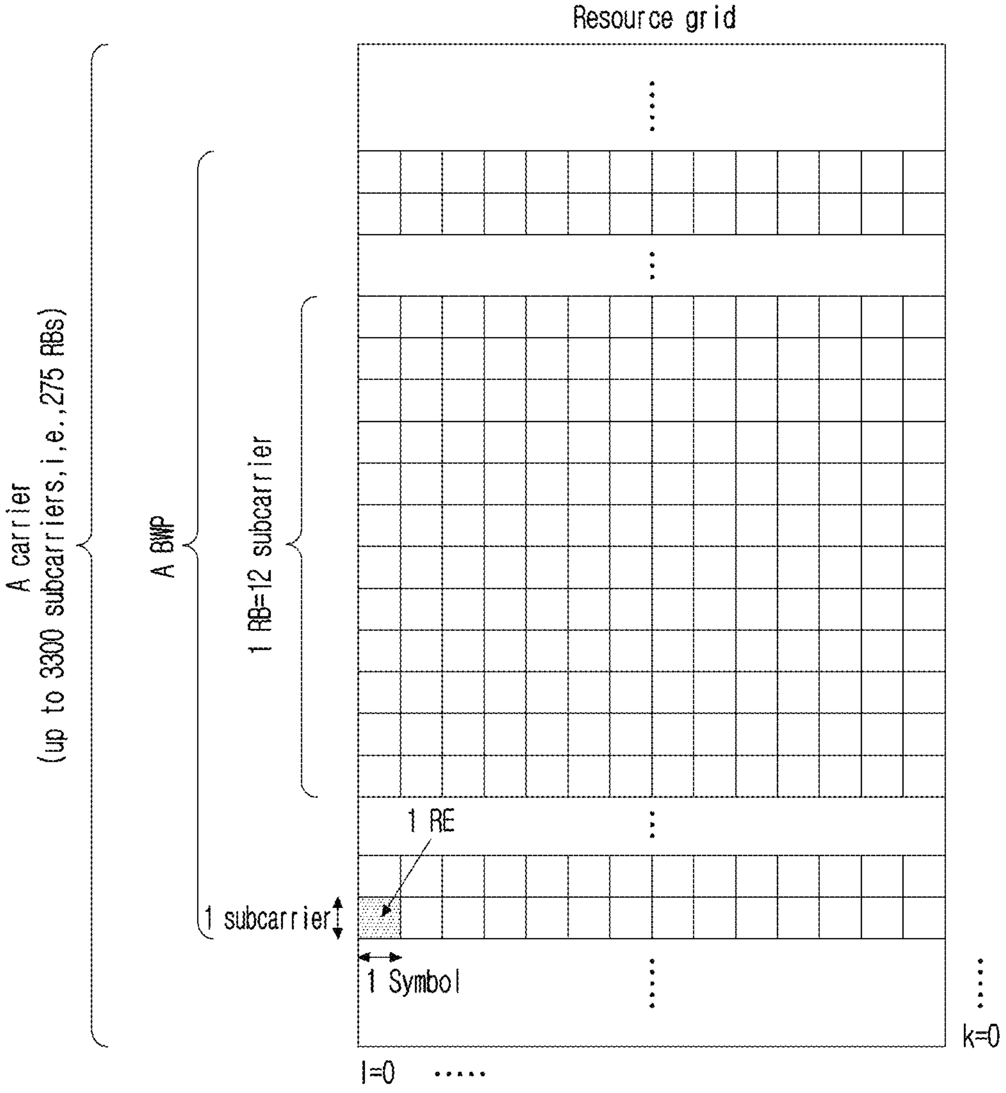
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
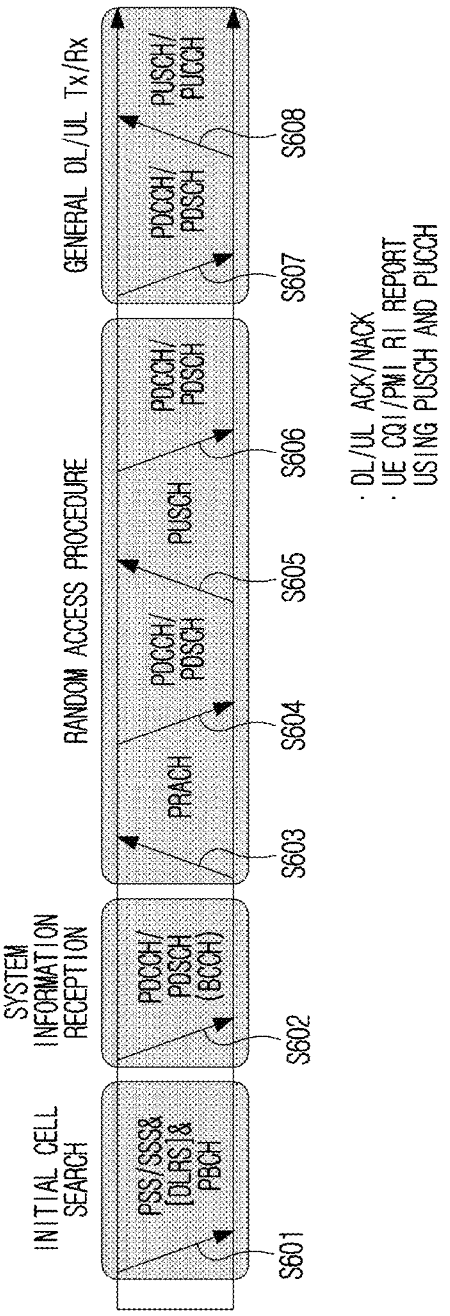
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1 2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1) For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Hereinafter, the CSI reporting configuration defined in 38.214 is described.

A UE calculates CSI parameters by assuming the following dependencies between CSI parameters.

LI is calculated conditional on the reported CQI, PMI, RI and CRI.

CQI is calculated conditional on the reported PMI, RI, and CRI.

PMI is calculated conditional on the reported RI and CRI.

RI is calculated conditional on the reported CRI.

The reporting configuration for CSI may be aperiodic (using PUSCH), periodic (using PUCCH), or semi-persistent (using PUCCH, and PUSCH activated by DCI), and CSI-RS resources may be periodic, semi-persistent or aperiodic. Table 6 below illustrates the supported combinations between CSI reporting configurations and CSI resource configurations and how CSI reporting is triggered for each CSI resource configuration. A periodic CSI-RS is configured by the higher layer. A semi-persistent CSI-RS is activated or deactivated according to the behavior defined in TS 38.214. An aperiodic CSI-RS is configured and triggered/activated according to the operations defined in TS 38.214.

Table 6 illustrates triggering/activation of CSI reporting for possible CSI-RS configurations.

TABLE 6

| CSI-RS configuration | Periodic CSI reporting | Semi-persistent CSI reporting | Aperiodic CSI reporting |
|---|---|---|---|
| Periodic CSI-RS | No dynamic triggering/activation | In reporting on a PUCCH, a UE receives an activation command. For reporting on a PUSCH, a UE receives triggering on DCI. | Triggered by DCI; Additionally, an activation command is possible. |
| Semi-persistent CSI-RS | Not supported | In reporting on a PUCCH, a UE receives an activation command. For reporting on a PUSCH, a UE receives triggering on DCI. | Triggered by DCI; Additionally, an activation command is possible. |
| Aperiodic CSI-RS | Not supported | Not supported | Triggered by DCI; Additionally, an activation command is possible. |

Hereinafter, information related to activation/deactivation/triggering by MAC-CE related to semi-persistent/aperiodic CSI reporting defined in TS 38.321 is exemplified.

Activation/Deactivation of Semi-Persistent CSI-RS/CSI-IM Resource Set

By transmitting a semi-persistent (SP) CSI-RS/CSI-IM Resource Set Activation/Deactivation MAC CE, a network may activate and/or deactivate the semi-persistent CSI-RS/CSI-IM resource set configured in a serving cell. The configured semi-persistent CSI-RS/CSI-IM resource set is deactivated initially upon configuration and after handover.

A MAC entity does i) When the MAC entity receives a SP CSI-RS/CSI-IM Resource Set Activation/Deactivation MAC CE on a serving cell, ii) Indicates information related to a SP CSI-RS/CSI-IM Resource Set Activation/Deactivation MAC CE to a lower layer.

Aperiodic CSI Trigger State Sub-Selection

By transmitting an Aperiodic CSI Trigger State Subselection MAC CE, a network may select among the configured aperiodic CSI trigger states of a serving cell.

A MAC entity does i) When the MAC entity receives an Aperiodic CSI Trigger State Subselection MAC CE on a serving cell, ii) Indicates information related to an Aperiodic CSI Trigger State Subselection MAC CE to a lower layer.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

In addition, an MTRP-URLLC may mean that the same TB (Transport Block) is transmitted using different layers/time/frequencies of M-TRPs. A UE configured with an MTRP-URLLC transmission method may be indicated with multiple TCI state(s) by DCI, and it may be assumed that data received using a QCL RS of each TCI state is the same TB. On the other hand, an MTRP-eMBB may mean that different TBs are transmitted using different layers/time/frequencies by M-TRPs. A UE configured with an MTRP-eMBB transmission method is indicated by several TCI state(s) by DCI, and it may be assumed that data received using a QCL RS of each TCI state are different TBs. In this regard, as a UE separates and uses an RNTI configured for an MTRP-URLLC purpose and an RNTI configured for an MTRP-eMBB purpose, it may be decided/determined whether corresponding M-TRP transmission is URLLC transmission or eMBB transmission. That is, when CRC masking of DCI received by a UE is performed using an RNTI configured for an MTRP-URLLC purpose, this may correspond to URLLC transmission, and CRC masking of DCI is performed using an RNTI configured for an MTRP-eMBB purpose, this may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter ControlResourceSet information element (IE) is used to configure a time/frequency control resource set (CORESET). For example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. As an example, an index of a CORESET pool (e.g., CORESETPoolIndex) may be set to 0 or 1. In the above description, a CORESET group may correspond to a CORESET pool, and a CORESET group ID may correspond to a CORESET pool index (e.g., CORESETPoolIndex).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
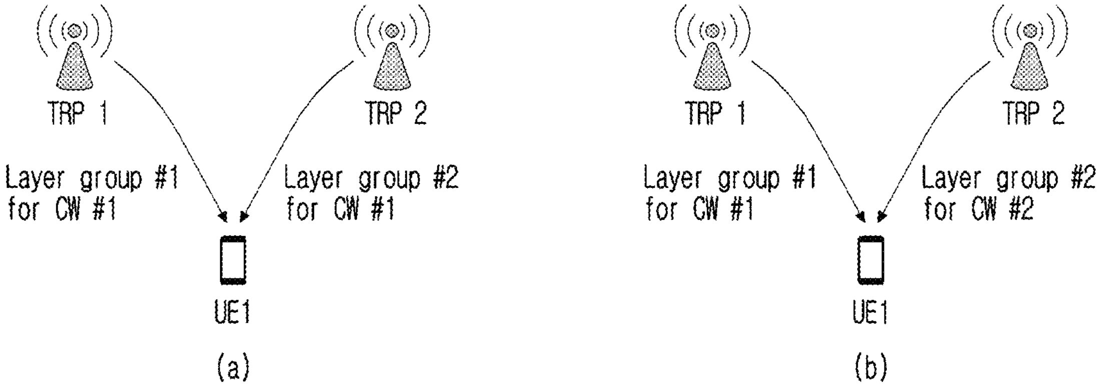
FIG. 7 illustrates a method of multiple TRPs transmission in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Method for Reporting Reception Timing (RX Timing)

When considering multi-TRP transmission introduced in Rel-16/17, an RX timing (RXT) may have different values for each TRP-UE. For example, for TRP1-UE, RXT1 may be required, and for TRP2-UE, RXT2 may be required, and RXT1 and RXT2 may have different values. For example, if a distance between TRP-UEs is relatively large, differences in RXT values as described above may occur. For example, if a distance with TRP1-UE is referred to as Dist1 and a distance with TRP2-UE is referred to as Dist2, Dist1 may be relatively larger than Dist2 (Dist1>>Dist2). In this case, it can be |RXT1−RXT2|>>0.

To support multi-TRP transmission in the Rel-16/17 standard, different TRPs can be distinguished based on the following. For example, based on a CORESET pool index (e.g. CORESETPoolindex), a TCI state, spatial relationship information (e.g. SpatialRelationInfo), a path loss reference signal (e.g. PathlossReferenceRS), etc., signals transmitted from different TRPs or signals transmitted to different TRPs may be distinguished.

As in the above example, when a difference between RXT1 and RXT2 increases, multi-TRP transmission performance may be degraded. For example, if a difference between RXT1 and RXT2 becomes greater than a cyclic prefix (CP) length, it can be expected that significant performance degradation will occur due to inter symbol interference (ISI) between two signals.

In order to solve the above-mentioned problems, the present disclosure proposes a method by which a terminal can report a TRP combination with similar/same RXT to a base station. A base station can prevent performance degradation by performing multi-TRP transmission based on TRP combinations with similar/same RXT from a terminal's perspective based on the TRP combination information reported by the terminal.

The description of TRP in the present disclosure is for convenience of explanation, and a TRP can also be interpreted as a term such as a panel/beam.

In the present disclosure, layer 1 (L1) signaling may mean DCI-based dynamic signaling between a base station and a terminal, and layer 2 (L2) signaling may refer to higher layer signaling based on an RRC/MAC control element (CE) between a base station and a terminal.

Hereinafter, the method proposed in the present disclosure may be applied independently and/or may be applied/supported in a form of a combination of a plurality of proposed methods.

Hereinafter, in the present disclosure, 'information on a reception timing of a received signal/received signal group' may be interpreted as including any one or more information of RX timing information of a received signal or a received signal group/set, information on a received signal/received signal group with the same/similar RX timing, information on a set of received sign/group of received signals whose reception timing difference is within a specific threshold.

In addition, for convenience of explanation, a wireless signal is referred to as a received signal in terms of a terminal, but the present disclosure is not limited thereto and may be interpreted as a wireless signal instead.

Embodiment #A1: Method for a Terminal to Report RX Timing Information of a Received Signal or a Group/Set of Received Signals to a Base Station Here, a received signal group/set refers to a group/set including one or more received signals.

In this disclosure, 'RX timing' may mean timing synchronization/specific time applied/assumed by a terminal in a process of decoding a received signal. For example, when a terminal receives an OFDM signal, it can be interpreted as a start time of a fast Fourier transform (FFT) window applied to a received signal. And/or a received signal may be interpreted as a start/end time of a specific received frame/subframe/slot/symbol.

In this disclosure, examples of the 'received signal/received signal group' may include the following. For example, a reference signal (e.g., tracking reference signal (TRS), channel state information reference signal (CSI-RS), sounding reference signal (SRS), demodulation reference signal (DMRS), phase tracking reference signal (PTRS), etc.) (and/or group/set of reference signals), a physical channel (e.g., PDCCH, PDSCH, PUCCH, PUSCH, PBCH, etc.) (and/or group/set of physical channels), a CORESET pool index (CORESETPoolIndex), a CORESET (and/or group/set of CORESETs), an search space (SS) set (and/or group/set of SS sets), a transmission configuration indication (TCI) state (group/set of TCI states), an SRS resource indicator (SRI) (and/or group/set of SRIs), spatial relationship information (e.g., RRC parameter SpatialRelationInfo) (and/or group/set of spatial relationship information), a pathloss reference signal (PLRS) (e.g., RRC parameter PathlossReferenceRS) (and/or group/set of PLRSs), a BWP (and/or group/set of BWPs), etc. may be included.

In the above example, in the case of a CORESET pool index, a value of a specific CORESET pool index can be interpreted as a set reference signal/physical channel. Additionally, in the case of an SRI, it can be interpreted as an SRS indicated by a specific SRI. In the case of a TCI state, a specific TCI state (or a specific TCI state ID (identity)) may be interpreted as a set reference signal/physical channel. Additionally, it can be interpreted as a reference signal/physical channel in which spatial relationship information (or specific spatial relationship information ID) is configured.

In addition, as described above, in order to support multi-TRP transmission in the current standard, different TRPs can be distinguished based on a CORESET pool index, a TCI state, spatial relationship information, a PLRS, etc. Therefore, the 'received signal/received signal group' can be interpreted as a group including multiple signals/multiple signals transmitted at the same transmission timing related to (configured) (i.e. associated with different TRPs) different CORESET pool indexes. Alternatively, the 'received signal/received signal group' may be interpreted as a group including multiple signals/multiple signals transmitted at the same transmission timing related to (configured) (i.e. associated with different TRPs) different TCI states. Alternatively, the 'received signal/received signal group' may be interpreted as a group including multiple signals/multiple signals transmitted at the same transmission timing related to (configured) (i.e. associated with different TRPs) different spatial relationship information. Alternatively, the 'received signal/received signal group' may be interpreted as a group including multiple signals/multiple signals transmitted at the same transmission timing related to (configured) (i.e. associated with different TRPs) different PLRSs.

Embodiment #A1-1: Method for a Terminal to Report Information on a Received Signal/Group of Received Signals Having the Same/Similar RX Timing to a Base Station Here, 'same/similar RX timing' may mean that in a process of decoding different received signals (or groups of received signals), a terminal can receive/decode based on the same/similar timing synchronization/specific time. For example, a terminal may report information on the received signal/received signal group with the same/similar start/end time of the x-th frame/subframe/slot/symbol to a base station. In other words, a terminal can report information on received signals (or groups of received signals) whose start or end time is the same or similar to a frame/subframe/slot/symbol in which signals were received among signals transmitted at the same transmission timing from different TRPs (e.g. associated with different CORESET pool indexes, different TCI states, different spatial relationship information, different PLRSs) to a base station.

Here, for example, a unit used to calculate the same/similar RX timing of a received signal/received signal group may be predefined/determined among frame/subframe/slot/symbol or configured by a base station.

For example, assume that a first reference signal corresponding to TRP 1, a second reference signal corresponding to TRP 2, and a third reference signal corresponding to TRP 3 are transmitted at the same timing. When reporting by a slot, if a slot in which reception of first and second reference signals begins is the same, and a slot in which reception of a third reference signal begins is different from that, a terminal can report information on the first and second reference signals to a base station.

And/or, a terminal may report a set/group of DL received signals whose timing difference is within a specific threshold among N DL received signals configured by a base station.

Here, the 'DL received signal' may include a received signal/received signal group exemplified in Embodiment #A1.

Additionally, the 'timing difference' can be calculated based on the example of a specific time in Embodiment #A1. Additionally, the 'timing difference' may mean a difference between the start (or end) of reception of signals transmitted at the same timing.

The 'threshold' may be a value configured by a base station to a terminal based on L1/L2 signaling, etc. And/or the 'threshold' may be a value reported by a terminal based on a CSI report or UE capability report, or a value determined from a value reported by a terminal. And/or the 'threshold' may be determined by a fixed rule between a base station and a terminal or a value defined in a standard specification.

A terminal may report information on a received signal/received signal group to a base station as in the following example.

For example, it is assumed that TRS 1, TRS 2, TRS 3, and TRS 4 are configured as DL signals by a base station for reporting a reception timing of a terminal, group 0 is configured to TRS 1 and TRS 2, and group 1 is configured to TRS 3 and TRS 4. In this case, a terminal can calculate a reception timing difference between TRS 1 and TRS 2 belonging to group 0, and also calculate a reception timing difference between TRS 3 and TRS 3 belonging to group 1. In addition, a terminal can report, to a base station, information on a group whose timing difference is within a predetermined or threshold configured by a base station. For example, if a timing difference between TRS 1 and TRS 2 belonging to group 0 is within a threshold, a terminal can report the value of '0' to a base station and if a timing difference between TRS 1 and TRS 2 belonging to group 1 is within a threshold, a terminal can report the value of '1' to a base station. The opposite is possible.

Here, in the above example, a 1-bit reporting value is assumed for convenience of explanation, but multiple bits may be used for reporting. For example, if both group 0 and group 1 are not within a threshold, a terminal may report the value of '0' ('00' bit) to a base station. In addition, if a timing difference between TRS 1 and TRS 2 belonging to group 0 is within a threshold, a terminal can report the value of '1' ('01' bit) to a base station and if a timing difference between TRS 1 and TRS 2 belonging to group 1 is within a threshold, a terminal can report the value of '2' ('10' bits) to a base station. Additionally, if both group 0 and group 1 are within a threshold, a terminal can report the value of '3' ('11' bits) to a base station.

And/or, in the above-described proposed method, a reference subcarrier spacing (SCS) can be defined/configured for 'reception timing'. That is, since a length of a symbol may vary depending on SCS, if reception timings for received signals are calculated in cells with different SCS, the difference in the same/similar reception timing may not be calculated. Accordingly, a terminal can calculate a reception timing difference for a received signal/received signal group based on the predefined/configured reference SCS. And/or, the reference SCS may be individually defined for each frequency range (e.g., FR1, FR2, etc.).

In addition, the following signaling method can be applied in relation to the method of 'reporting information on a reception timing of a received signal/received signal group to a base station' of the above-mentioned proposed method.

For example, a triggering mechanism may be used. In this case, a base station may transmit control information (e.g. via DCI, MAC CE, etc.) that triggers reporting of 'information on a reception timing of a received signal/group of received signals', and a terminal that receives this can report 'information on a reception timing of a received signal/received signal group' to a base station.

As another example, a terminal may use the above-described proposed method in an event-based manner. In this case, when a predetermined event occurs, a terminal can report 'information on a reception timing of a received signal/received signal group' to a base station.

As another example, a terminal may report 'information on a reception timing of a received signal/received signal group' to a base station periodically/semi-persistently/aperiodically. Additionally, upon initiation by a network/terminal, a terminal can report 'information on a reception timing of a received signal/received signal group' to a base station.

As another example, when transmitting CSI to a base station on a PUCCH/PUSCH, a terminal may transmit to a base station including 'information on a reception timing of a received signal/received signal group'.

And/or in the above-mentioned proposed method, when reporting 'information on a reception timing of a received signal/received signal group' to a base station, a terminal may report terminal's panel/beam information together. And/or a base station may configure/indicate terminal's panel/beam information to be assumed for the received signal/received signal group, in this case, the terminal can calculate an RX timing based on the information and report the 'information on the reception timing of the received signal/received signal group' to a base station.

Embodiment #A1-2: To Support Embodiment #1/#1-1 Above, a Method for Configuring/Indicating a Terminal to Report CSI with Multiple TRS (and/or SSB/CSI-RS) Connected A base station may configure/indicate a terminal to report CSI with one or more TRS (and/or SSB/CSI-RS) connected/associated (e.g., CSI-ReportConfig).

And/or, the 'CSI report with multiple TRS connected' may mean that multiple NZP (non-zero) CSI-RS resource sets are connected/associated to a single CSI report. Here, a plurality of NZP CSI-RS resource sets can be configured so that antenna ports for all NZP CSI-RS resources in each NZP CSI-RS resource set are the same (e.g., a value of RRC parameter trs-Info is true).

And/or, a base station may configure/indicate a terminal to report the 'information on the reception timing of the received signal/received signal group' within the CSI report. And/or, in response to the CSI report configuration/indication, a terminal may report 'information on the reception timing of the received signal/received signal group' to a base station based on Embodiment #1-1.

Figure 8:
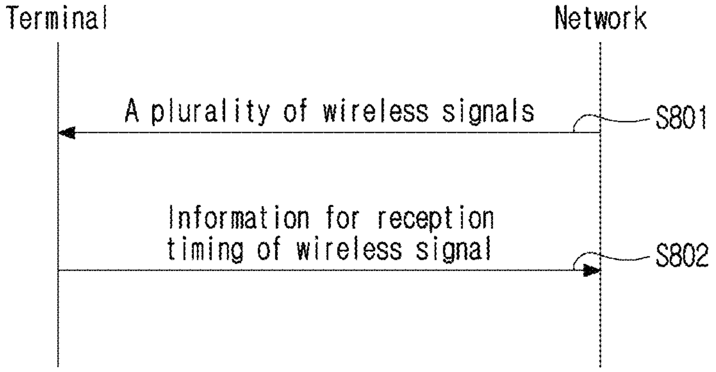
FIG. 8 is a diagram illustrating a signaling procedure between a base station and a terminal for a method of transmitting and receiving information on a reception timing of a wireless signal according to an embodiment of the present disclosure.

FIG. 8 is a diagram illustrating a signaling procedure between a base station and a terminal for a method of transmitting and receiving information on a reception timing of a wireless signal according to an embodiment of the present disclosure.

FIG. 8 exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., any one or a combination of Embodiments #A1/#A1-1/#A1-2) proposed in the present disclosure may be applied.

Figure 11:
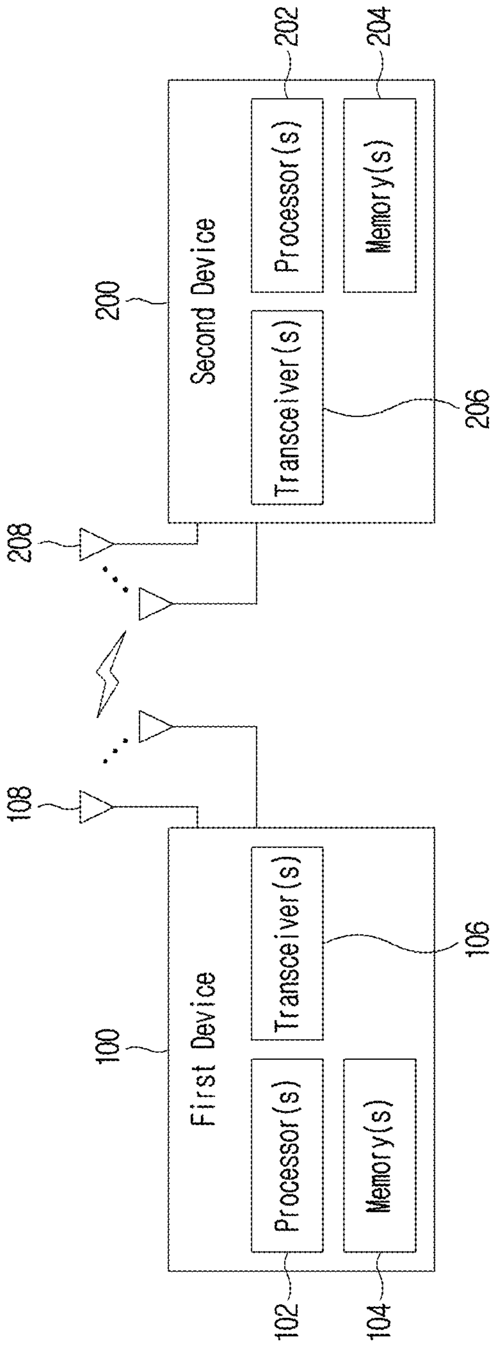
FIG. 11 illustrates a block diagram of a wireless communication device according to an embodiment of the present disclosure.

Here, UE/Network may be an example and may be applied by being substituted with a variety of devices as described in FIG. 11. FIG. 8 is only for convenience of description, but it is not intended to limit a scope of the present disclosure. In addition, some step(s) shown in FIG. 8 may be omitted according to a situation and/or a configuration, etc.

In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

In addition, as described above, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, a base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc.

Referring to FIG. 8, for convenience of explanation, signaling between one network (base station) and a UE is considered, but of course, the signaling method can be extended and applied to signaling between multiple TRPs and multiple UEs.

Referring to FIG. 8, a network transmits a plurality of wireless signals to a terminal (S801). That is, a terminal receives a plurality of wireless signals from a network.

Here, the plurality of wireless signals may include a reference signal (e.g. TRS, CSI-RS, DMRS, PTRS, etc.), a physical channel (e.g. PDCCH, PDSCH, PUCCH, PUSCH, PBCH, etc.), etc., as described above. Additionally, the plurality of wireless signals may be related to different CORESET pool indexes, TCI states, spatial relationship information, PLRSs, etc. (i.e., multiple wireless signals may correspond to different TRPs). Additionally, the plurality of wireless signals may be wireless signals transmitted at the same transmission timing from each TRP.

Additionally, the plurality of wireless signals may be grouped into a plurality of wireless signal groups (by configuration by a base station, etc.). In this case, each wireless signal group may include a plurality of wireless signals, and the plurality of wireless signals belonging to each wireless signal group may be related to different CORESET pool indexes, TCI states, spatial relationship information, PLRSs, etc. (i.e., multiple wireless signals may correspond to different TRPs). Additionally, a plurality of wireless signals belonging to each wireless signal group may be wireless signals transmitted at the same transmission timing from each TRP.

Although not shown in FIG. 8, a terminal may receive configuration information about the plurality of wireless signals from a network. In this case, configuration information may include identification information on a plurality of wireless signals for which a terminal is to measure reception timing. Additionally, when the plurality of wireless signals are grouped into a plurality of wireless signal groups, the configuration information includes information on a plurality of wireless signal groups, and may include identification information on a plurality of wireless signal signals included for each wireless signal group.

Additionally, although not shown in FIG. 8, a terminal may receive configuration information related to CSI from a network. Here, configuration information related to CSI may include at least one of CSI-IM (interference management) resource related information, CSI measurement configuration-related information, CSI resource configuration-related information, CSI-RS resource-related information, or CSI report configuration-related information.

A terminal transmits information on a reception timing of a wireless signal to a network (S802).

As described above, the information on the reception timing of the wireless signal may include any one or more of RX timing information of a wireless signal, information on wireless signals having the same/similar RX timing, or a set of wireless signals whose reception timing difference is within a certain threshold.

In addition, when the plurality of wireless signals are grouped into a plurality of wireless signal groups (by a configuration by a base station, etc.), the information on the reception timing of the wireless signal may include any one or more of RX timing information of wireless signals belonging to each wireless signal group, information on wireless signal groups including wireless signals with the same/similar RX timing, or information on wireless signal groups where a difference in reception timings of wireless signals belonging to each wireless signal group is within a specific threshold.

Here, the reception timing difference may be calculated in absolute time or may be determined/calculated based on a start or end time of a time unit in which wireless signals were received. For example, a time unit may be one of a frame, subframe, slot, or a symbol.

Additionally, as described above, the reception timing difference may be determined/calculated based on predefined reference subcarrier spacing.

Additionally, the predetermined threshold may be i) configured by a base station, ii) determined based on a value reported by a terminal, or iii) determined by a predefined rule.

In addition, the information on the reception timing of the wireless signal may be, as described above, transmitted by triggering by a base station, transmitted based on an event, or transmitted periodically, semi-persistently, or aperiodically.

For example, the information on the reception timing of the wireless signal may be transmitted in a CSI report. In this case, the plurality of radio signal groups may correspond to a plurality of NZP CSI-RS resource sets associated with the CSI report, and wireless signals belonging to each plurality of radio signal groups may correspond to NZP CSI-RS resources belonging to each NZP CSI-RS resource set. Here, a plurality of NZP CSI-RS resource sets may be configured so that antenna ports for all NZP CSI-RS resources within each NZP CSI-RS resource set are the same (e.g., trs-Info configuration).

Figure 9:
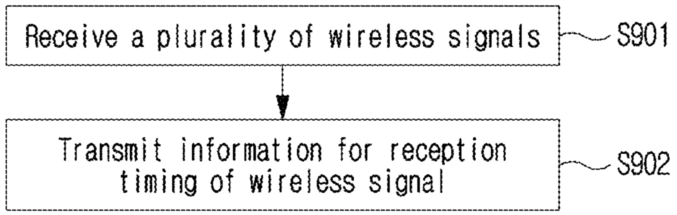
FIG. 9 is a diagram illustrating an operation of a terminal for a method of transmitting and receiving information on a reception timing of a wireless signal according to an embodiment of the present disclosure.

FIG. 9 is a diagram illustrating an operation of a terminal for a method of transmitting and receiving information on a reception timing of a wireless signal according to an embodiment of the present disclosure.

FIG. 9 exemplifies an operation of a terminal based on the above-described proposed method (e.g., any one or a combination of Embodiments #A1/#A1-1/#A1-2). FIG. 9 is only for convenience of description, but it is not intended to limit a scope of the present disclosure. Some step(s) shown in FIG. 9 may be omitted according to a situation and/or a configuration, etc. In addition, the terminal in FIG. 9 is only one example, and may be implemented as a device illustrated in FIG. 11. For example, a processor (102/202) of FIG. 11 may control to transmit and receive channel/signal/data/information, etc. by using a transceiver (106/206), and control to store transmitted or received channel/signal/data/information in a memory (104/204).

Referring to FIG. 9, a terminal receives a plurality of wireless signals from a base station (S901).

Here, the plurality of wireless signals may include a reference signal (e.g. TRS, CSI-RS, DMRS, PTRS, etc.), a physical channel (e.g. PDCCH, PDSCH, PUCCH, PUSCH, PBCH, etc.), etc., as described above. Additionally, the plurality of wireless signals may be related to different CORESET pool indexes, TCI states, spatial relationship information, PLRSs, etc. (i.e., multiple wireless signals may correspond to different TRPs). Additionally, the plurality of wireless signals may be wireless signals transmitted at the same transmission timing from each TRP.

Additionally, the plurality of wireless signals may be grouped into a plurality of wireless signal groups (by configuration by a base station, etc.). In this case, each wireless signal group may include a plurality of wireless signals, and the plurality of wireless signals belonging to each wireless signal group may be related to different CORESET pool indexes, TCI states, spatial relationship information, PLRSs, etc. (i.e., multiple wireless signals may correspond to different TRPs). Additionally, a plurality of wireless signals belonging to each wireless signal group may be wireless signals transmitted at the same transmission timing from each TRP.

Although not shown in FIG. 9, a terminal may receive configuration information about the plurality of wireless signals from a network. In this case, configuration information may include identification information on a plurality of wireless signals for which a terminal is to measure reception timing. Additionally, when the plurality of wireless signals are grouped into a plurality of wireless signal groups, the configuration information includes information on a plurality of wireless signal groups, and may include identification information on a plurality of wireless signal signals included for each wireless signal group.

Additionally, although not shown in FIG. 9, a terminal may receive configuration information related to CSI from a base station. Here, configuration information related to CSI may include at least one of CSI-IM (interference management) resource related information, CSI measurement configuration-related information, CSI resource configuration-related information, CSI-RS resource-related information, or CSI report configuration-related information.

A terminal transmits information on a reception timing of a wireless signal to a base station (S902).

As described above, the information on the reception timing of the wireless signal may include any one or more of RX timing information of a wireless signal, information on wireless signals having the same/similar RX timing, or a set of wireless signals whose reception timing difference is within a certain threshold.

In addition, when the plurality of wireless signals are grouped into a plurality of wireless signal groups (by a configuration by a base station, etc.), the information on the reception timing of the wireless signal may include any one or more of RX timing information of wireless signals belonging to each wireless signal group, information on wireless signal groups including wireless signals with the same/similar RX timing, or information on wireless signal groups where a difference in reception timings of wireless signals belonging to each wireless signal group is within a specific threshold.

Here, the reception timing difference may be calculated in absolute time or may be determined/calculated based on a start or end time of a time unit in which wireless signals were received. For example, a time unit may be one of a frame, subframe, slot, or a symbol.

Additionally, as described above, the reception timing difference may be determined/calculated based on predefined reference subcarrier spacing.

Additionally, the predetermined threshold may be i) configured by a base station, ii) determined based on a value reported by a terminal, or iii) determined by a predefined rule.

In addition, the information on the reception timing of the wireless signal may be, as described above, transmitted by triggering by a base station, transmitted based on an event, or transmitted periodically, semi-persistently, or aperiodically.

For example, the information on the reception timing of the wireless signal may be transmitted in a CSI report. In this case, the plurality of radio signal groups may correspond to a plurality of NZP CSI-RS resource sets associated with the CSI report, and wireless signals belonging to each plurality of radio signal groups may correspond to NZP CSI-RS resources belonging to each NZP CSI-RS resource set. Here, a plurality of NZP CSI-RS resource sets may be configured so that antenna ports for all NZP CSI-RS resources within each NZP CSI-RS resource set are the same (e.g., trs-Info configuration).

Figure 10:
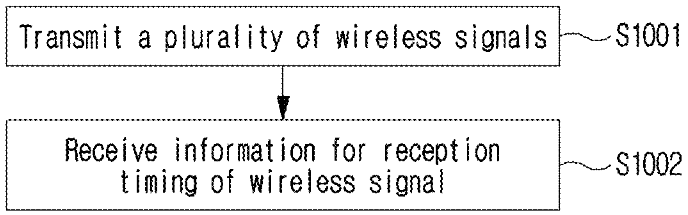
FIG. 10 is a diagram illustrating an operation of a base station in a method for transmitting and receiving information on a reception timing of a wireless signal according to an embodiment of the present disclosure.

FIG. 10 is a diagram illustrating an operation of a base station in a method for transmitting and receiving information on a reception timing of a wireless signal according to an embodiment of the present disclosure.

FIG. 10 exemplifies an operation of a base station based on the above-described proposed method (e.g., any one or a combination of Embodiments #A1/#A1-1/#A1-2). FIG. 10 is only for convenience of description, but it is not intended to limit a scope of the present disclosure. Some step(s) shown in FIG. 10 may be omitted according to a situation and/or a configuration, etc. In addition, the base station in FIG. 10 is only one example, and may be implemented as a device illustrated in FIG. 11. For example, a processor (102/202) of FIG. 11 may control to transmit and receive channel/signal/data/information, etc. by using a transceiver (106/206), and control to store transmitted or received channel/signal/data/information in a memory (104/204).

Referring to FIG. 10, a base station transmits a plurality of wireless signals to a terminal (S1001).

Here, the plurality of wireless signals may include a reference signal (e.g. TRS, CSI-RS, DMRS, PTRS, etc.), a physical channel (e.g. PDCCH, PDSCH, PUCCH, PUSCH, PBCH, etc.), etc., as described above. Additionally, the plurality of wireless signals may be related to different CORESET pool indexes, TCI states, spatial relationship information, PLRSs, etc. (i.e., multiple wireless signals may correspond to different TRPs). Additionally, the plurality of wireless signals may be wireless signals transmitted at the same transmission timing from each TRP.

Additionally, the plurality of wireless signals may be grouped into a plurality of wireless signal groups (by configuration by a base station, etc.). In this case, each wireless signal group may include a plurality of wireless signals, and the plurality of wireless signals belonging to each wireless signal group may be related to different CORESET pool indexes, TCI states, spatial relationship information, PLRSs, etc. (i.e., multiple wireless signals may correspond to different TRPs). Additionally, a plurality of wireless signals belonging to each wireless signal group may be wireless signals transmitted at the same transmission timing from each TRP.

Although not shown in FIG. 10, a base station may transmit configuration information about the plurality of wireless signals from a network. In this case, configuration information may include identification information on a plurality of wireless signals for which a terminal is to measure reception timing. Additionally, when the plurality of wireless signals are grouped into a plurality of wireless signal groups, the configuration information includes information on a plurality of wireless signal groups, and may include identification information on a plurality of wireless signal signals included for each wireless signal group.

Additionally, although not shown in FIG. 10, a base station may transmit configuration information related to CSI to a terminal. Here, configuration information related to CSI may include at least one of CSI-IM (interference management) resource related information, CSI measurement configuration-related information, CSI resource configuration-related information, CSI-RS resource-related information, or CSI report configuration-related information.

A base station receives information on a reception timing of a wireless signal from a terminal (S1002).

As described above, the information on the reception timing of the wireless signal may include any one or more of RX timing information of a wireless signal, information on wireless signals having the same/similar RX timing, or a set of wireless signals whose reception timing difference is within a certain threshold.

In addition, when the plurality of wireless signals are grouped into a plurality of wireless signal groups (by a configuration by a base station, etc.), the information on the reception timing of the wireless signal may include any one or more of RX timing information of wireless signals belonging to each wireless signal group, information on wireless signal groups including wireless signals with the same/similar RX timing, or information on wireless signal groups where a difference in reception timings of wireless signals belonging to each wireless signal group is within a specific threshold.

Here, the reception timing difference may be calculated in absolute time by a terminal or may be determined/calculated by a terminal based on a start or end time of a time unit in which wireless signals were received. For example, a time unit may be one of a frame, subframe, slot, or a symbol.

Additionally, as described above, the reception timing difference may be determined/calculated based on pre-defined reference subcarrier spacing.

Additionally, the predetermined threshold may be i) configured by a base station, ii) determined based on a value reported by a terminal, or iii) determined by a predefined rule.

In addition, the information on the reception timing of the wireless signal may be, as described above, transmitted by triggering by a base station, transmitted based on an event, or transmitted periodically, semi-persistently, or aperiodically.

For example, the information on the reception timing of the wireless signal may be transmitted in a CSI report. In this case, the plurality of radio signal groups may correspond to a plurality of NZP CSI-RS resource sets associated with the CSI report, and wireless signals belonging to each plurality of radio signal groups may correspond to NZP CSI-RS resources belonging to each NZP CSI-RS resource set. Here, a plurality of NZP CSI-RS resource sets may be configured so that antenna ports for all NZP CSI-RS resources within each NZP CSI-RS resource set are the same (e.g., trs-Info configuration).

General Device to which the Present Disclosure May be Applied

FIG. 11 is a diagram which illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a terminal, from a base station, reference signals belonging to a plurality of reference signal groups, wherein reference signals of each of the plurality of reference signal groups are related to different transmission configuration indication states or different control resource set pool indexes; and transmitting, by the terminal, to the base station, information on a reception timing of a reference signal, wherein the information on the reception timing of the reference signal includes information on a reference signal group in which a reception timing difference between the reference signals of each of the plurality of reference signal groups transmitted at the same time is less than a predetermined threshold.

2. The method of claim 1, wherein the reception timing difference is determined based on a start or end time of a time unit in which the reference signals are received, and wherein the time unit is one of a frame, a subframe, a slot, or a symbol.

3. The method of claim 1, wherein the predetermined threshold is i) configured by the base station, or ii) determined based on a value reported by the terminal, or iii) determined by a predefined rule.

4. The method of claim 1, wherein the information on the reception timing of the reference signal is transmitted periodically, semi-persistently, or aperiodically.

5. The method of claim 1, wherein the reception timing difference is determined based on predefined reference subcarrier spacing.

6. The method of claim 1, wherein the information on the reception timing of the reference signal is transmitted in a channel state information report.

7. The method of claim 6, wherein the plurality of reference signal groups are a plurality of non-zero power channel state information reference signal (NZP CSI-RS) resource sets related to the channel state information report.

8. The method of claim 7, wherein the plurality of NZP CSI-RS resource sets are configured so that antenna ports for all NZP CSI-RS resources in each NZP CSI-RS resource set are the same.

9. A terminal comprising:

at least one transceiver for transmitting and receiving a wireless signal; and at least one processor for controlling the at least one transceiver, wherein the at least one processor is configured to:

receive, from a base station, reference signals belonging to a plurality of reference signal groups, wherein reference signals of each of the plurality of reference signal groups are related to different transmission configuration indication states or different control resource set pool indexes; and transmit, to the base station, information on a reception timing of a reference signal, wherein the information on the reception timing of the reference signal includes information on a reference signal group in which a reception timing difference between the reference signals of each of the plurality of reference signal groups transmitted at the same time is less than a predetermined threshold.

10. A base station comprising:

at least one transceiver for transmitting and receiving a wireless signal; and at least one processor for controlling the at least one transceiver, wherein the at least one processor is configured to:

transmit, to a terminal, reference signals belonging to a plurality of reference signal groups, wherein reference signals of each of the plurality of reference signal groups are related to different transmission configuration indication states or different control resource set pool indexes; and receive, from the terminal, information on a reception timing of a reference signal, wherein the information on the reception timing of the reference signal includes information on a reference signal group in which a reception timing difference between the reference signals of each of the plurality of reference signal groups transmitted at the same time is less than a predetermined threshold.

* * * * *